(12) United States Patent
Ishiguro et al.

(10) Patent No.: US 7,477,880 B2
(45) Date of Patent: *Jan. 13, 2009

(54) COMMUNICATION DEVICE, IMAGE-PICKUP DEVICE, STORAGE MEDIUM AND COMMUNICATION METHOD

(75) Inventors: Satoshi Ishiguro, Ohta-ku (JP); Hiraku Sonobe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

This patent is subject to a terminal disclaimer.

(21) Appl. No.: 11/358,053

(22) Filed: Feb. 22, 2006

(65) Prior Publication Data

US 2006/0142059 A1 Jun. 29, 2006

Related U.S. Application Data

(62) Division of application No. 09/406,697, filed on Sep. 28, 1999, now Pat. No. 7,062,230.

(30) Foreign Application Priority Data

Sep. 30, 1998 (JP) .................................. 10-278633
Aug. 24, 1999 (JP) .................................. 11-237191

(51) Int. Cl.
*H04B 1/02* (2006.01)

(52) U.S. Cl. ..................... 455/91; 455/66.1; 455/556.1; 455/557

(58) Field of Classification Search .............. 455/556.1, 455/556.2, 557, 566, 91, 414.1, 66.1, 344; 348/211.2

See application file for complete search history.

(56) References Cited

U.S. PATENT DOCUMENTS

| | | | |
|---|---|---|---|
| 5,533,097 A | 7/1996 | Crane et al. ............. | 455/557 X |
| 5,666,159 A | 9/1997 | Parulski et al. ........... | 348/211.2 |
| 5,806,005 A | 9/1998 | Hull et al. .................... | 455/566 |
| 5,893,037 A | 4/1999 | Reele et al. ............... | 455/566.1 |
| 5,909,648 A | 6/1999 | Boudreaux et al. ...... | 455/466 X |
| 6,122,521 A | 9/2000 | Wilkinson et al. .......... | 455/457 |
| 6,249,681 B1 | 6/2001 | Virtanen ..................... | 455/466 |
| 6,690,417 B1 | 2/2004 | Yoshida et al. ........... | 348/231.1 |
| 6,826,400 B1 | 11/2004 | Cashman et al. ....... | 455/552.1 X |
| 6,961,087 B1 | 11/2005 | Yoshida .................... | 348/231.1 |
| 7,062,230 B1 * | 6/2006 | Ishiguro et al. ................ | 455/91 |

FOREIGN PATENT DOCUMENTS

| | | |
|---|---|---|
| JP | 05/167965 | 7/1993 |
| JP | 06/133081 | 5/1994 |
| JP | 11-237191 | 1/2004 |

* cited by examiner

*Primary Examiner*—Philip J Sobutka
(74) *Attorney, Agent, or Firm*—Fitzpatrick, Cella, Harper & Scinto

(57) ABSTRACT

A communication device is provided which is capable of transmitting pickup images efficiently with high portability, manipulativity and instantaneous response. The communication device is disclosed in which according to one preferred embodiment, a control apparatus starts a communicating (such as radio transmission) operation in a communication apparatus simultaneously to an image pickup operation in an image pickup function when a predetermined operation is instructed by a manipulation of a manipulation apparatus from a user in a communication device having the image pickup function. Thereby, the pickup images obtained by the image pickup function are automatically transmitted to a specified transmission destination via a communicative apparatus. Thus, a user can transmit pickup images to a desired transmission destination simultaneously only by making a simple manipulation of changing the operating mode of the device to a predetermined mode or the like.

15 Claims, 16 Drawing Sheets

| 431 | 432 | 433 | 434 | 435 | |
|---|---|---|---|---|---|
| NO. 1 | 99/06/01 10:20 | START ADDRESS 00000000 | END ADDRESS 0000FFFF | 640*480 F2.0 1/60 AUTO | WAIT — 435a |
| NO. 2 | 99/06/01 10:21 | START ADDRESS 00010000 | END ADDRESS 0001FFFF | 640*480 F4.0 1/60 AUTO | WAIT |
| NO. 3 | 99/06/01 10:21 | START ADDRESS 00020000 | END ADDRESS 0002FFFF | 1024*768 F2.8 1/30 DAY | WAIT |
| NO. 4 | 99/06/01 10:23 | START ADDRESS 00030000 | END ADDRESS 0003FFFF | 1024*768 F4.0 1/60 DAY | WAIT |

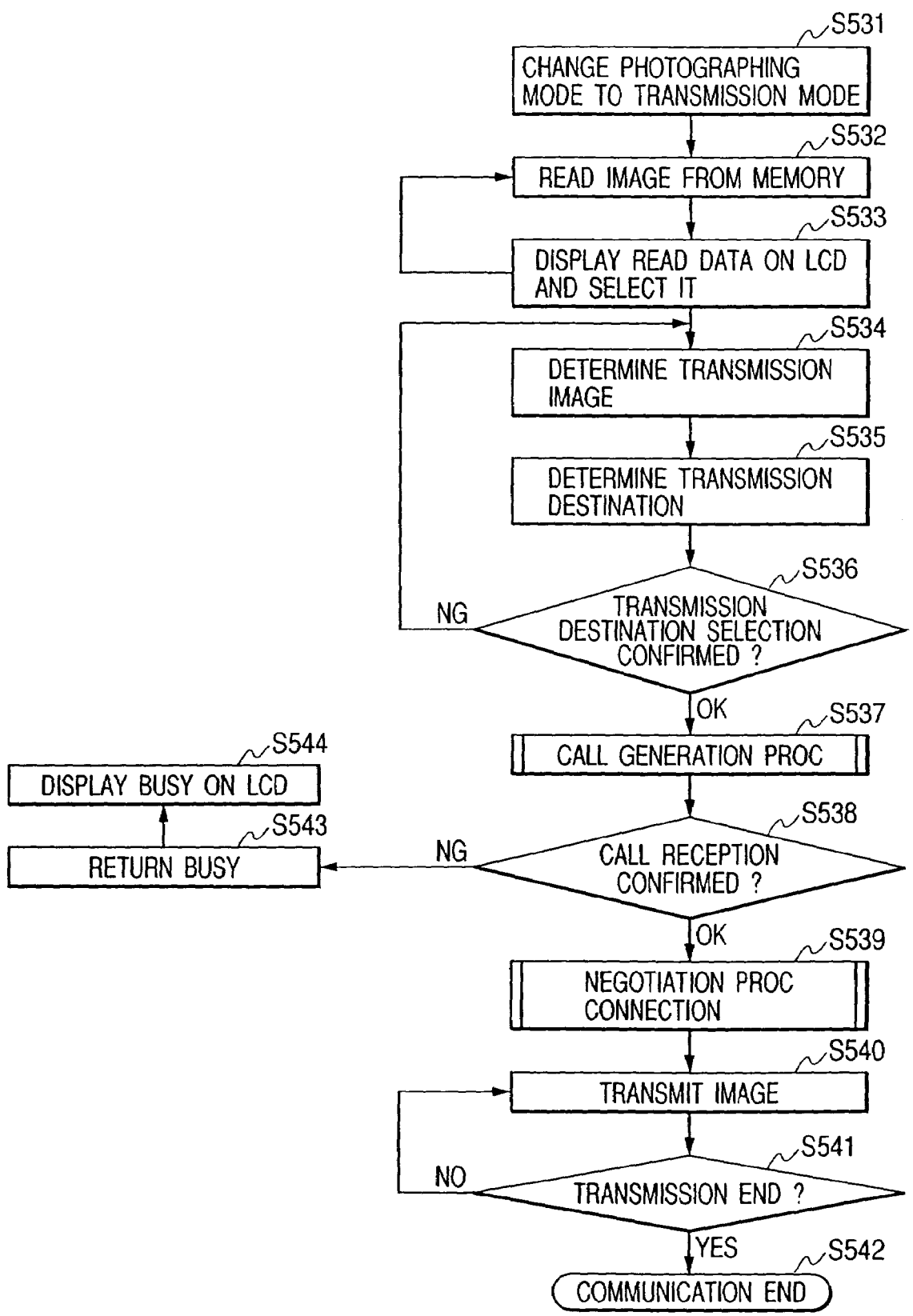

COMMUNICATION DEVICE, IMAGE-PICKUP DEVICE, STORAGE MEDIUM AND COMMUNICATION METHOD

CROSS-REFERENCE TO RELATED APPLICATION

This application is a divisional of U.S. patent application Ser. No. 09/406,697, filed Sep. 28, 1999, the entire disclosure of which is incorporated herein by reference.

BACKGROUND OF THE INVENTION

1. Field of the Invention

The present invention relates to the art used in a device or system having an image-pickup function and communicative function, and in particular to the art using the communicative function for radio transmission of an image information item obtained by the image pick-up function.

2. Related Background Art

So far, when radio-transmitting the picture image obtained by the image-pickup function of a digital camera or the like to a device such as remote place server through communication device such as portable phone or PHS (Personal Handyphone System), the following method is generally used.

As shown in FIG. 12, for example, connection between a digital camera 501 and a note model personal computer (hereinafter, referred to as "Note PC") 502 has been made using a cable 504 (or a PC card) and connection between a Note PC 502 and a potable phone 503 is also made by using a cable 504. Then, the pickup image obtained by using the digital camera 501 is transferred to the portable phone 503 after once transferred to the Note PC 502. Thus, as shown in FIG. 13, the pickup image transferred to the portable phone 503 is radio-transmitted via a general public network 506 to a server 507 located at a remote place.

However, such a method was advantageous in that a former device could be utilized as it was, but with disadvantageous problems that the construction became so complicated as to damage the portability or manipulativity.

Then, to solve these problems, a composite device (or multifunctional device) 510 having the image-pickup function of a digital camera or the like and the communicative function of a portable phone, a PHS or the like, for example, as shown in FIG. 14, has been proposed.

As shown in FIG. 14, the composite device comprises a lens 511 for focusing a subject ray to a image pickup such as CCD, a shutter button (shutter switch) 512, a switch group 513 made of a plurality of manipulating switches, a color LC (Liquid Crystal) 514 for displaying the pickup image obtained by the above image pickup element and a communicative antenna 515.

With such a composite device 510, a process from the photographing of a subject to the radio transmission of the pickup image thereby obtained to a server is executed, for example, according to the flow charts of FIGS. 15 and 16.

First of all (See FIG. 15), a user set up a composite device 510 to the photographing mode by manipulating a given manipulating switch in the switch group 513, instructs the start of a photographing operation and depresses a shutter switch 512 at a desired timing (step S521).

Thereby, an interruption occurs in the composite device 510 (step S522) and the pickup image signal of a subject obtained with a pickup element is once taken into an image buffer memory (step S523).

After various corrections on brightness, white balance or the like, the pickup image signal incorporated into the image buffer memory is submitted to a format conversion into the JPEG form or the like (step S524).

The pickup data made up through such steps is finally stored into a store memory (step S525).

Next (See FIG. 16), if the image pickup data obtained thus in the composite device 510 are transmitted to a remote place server, a user sets the composite device 510 to the transmit mode by manipulating a given manipulating switch in the switch group 513 (step S531).

Incidentally, instead of the switch group 513, a mode-switching manipulation here may be made on the menu screen of a color LC 514. Besides, the step S531 may be executed after the step S534 mentioned later.

Thereby, in the composite device 510, read of the pickup image data stored in the store memory is started (step S532). And, the readout pickup image data are screen-displayed by means of the color LC 514 (step S533).

By manipulating a given manipulating switch in the switch group 513, a user selects an image to be transmitted from the pickup image data screen-displayed on the color LC 514 (step S534). Selecting an image at this time relates to a single image, two images or more, or all images stored in the store memory.

Besides, by manipulating a given manipulating switch in the switch group 513, a user selects the partner server to whom to transmit the image selected at the step S534 (step S535). In selecting a server at this time, a method of selecting it from the phone book data preliminarily stored inside the composite device 510, directly inputting the partner phone number from the switch group 513 or the like.

In the composite device 510, a processing for confirming the image to be transmitted and the transmission destination to a user is performed when the user manipulation at the steps S534 and S535 is recognized at the composite device 510 (step S536). As a result, if an instruction of "OK" is made from a user by means of the switch group 513 or the like, the image transmission processing from the next step is actually executed.

Incidentally, if the instruction made from a user is "NG", the procedure is returned to the step S534 and the processing from the determination of an image to be transmitted is executed.

Namely, first, according to a procedure depending on the type of a composite device 510 (if the communicative function pertaining to the device is PHS, for example, a transmission control procedure like "PIAFS: PHS Internet Access Forum Standard"), a call generation to the public network is made (step S537). Thereby, to the composite device 510, the OK or NG of call reception is sent back from the call destination server.

And, if the server is capable of being called as a result of confirming the OK or NG of call reception from the server (step S538), an inter-device connection between the composite device 510 and the server is established after a mutual negotiation processing (step S539).

When the negotiation between the composite device 510 and the server is completed and the communication according to a protocol such as TCP/IP (Transmission Control Protocol/Internet Protocol) becomes possible, processing for transmitting the image selected at the step S534 to the server is executed in the composite device 510 (step S540). The error processing during a communication, retransmit processing or the like at this time is performed according to the procedure depending on the type of a composite device 510 at the step S537 and finally all images are finished at transmission, or the communication with the server ends at the time point (step S541) of receiving the message of receive end from the server (step S542).

On the other hand, if the server is incapable of being called as a result of confirming the OK or RG of call reception therefrom (step S538), that is, if call reception is disapproved for the reason of being busy or the like therefrom (step S543), a screen display of the message displaying this effect is performed in the composite device 510 (step S544).

In this case, a user must attempt a reconnection after the lapse of some time.

Meanwhile, at the background of a composite device 510 proposed as shown in FIG. 14, it can be referred to that promotion of an instance response based on the transmittance of an image on the spot is requested in addition to the portability and manipulativity.

For this object, it is desired that the procedure for transmitting an image after the photographing is as simple and easy as possible.

With a former composite device 510, however, a user needed at least three times switching manipulations of the step S531 (mode changing manipulation), the step S534 (selecting manipulation of a transmit image) and the step S535 (selecting manipulation of a transmission destination) to transmit the pickup image obtained in the photographing mode to the server as shown in FIG. 16.

This provides no problem when no instantaneous response is so much required such as the case of transmitting the accumulated photograph images collectively afterward, but becomes very troublesome, for example, in a case where it is desired to transmit only one image of the subject before eyes to a server or like cases.

Besides, also in a case where it is desired to transmit successive photographed images to a server during the continuous photographing but not a single image only, the photographing must be interrupted once for the transmission and there occurs a possibility of missing a shutter chance during this interruption.

SUMMARY OF THE INVENTION

It is one object of the present invention to solve all or at least one of the problems mentioned above.

Besides, it is another object of the present invention to reduce the troublesomeness in transmitting image data.

Furthermore, it is still other object of the present invention to transmit an image without any damage to the instantaneous response of image pickup means.

Under these objects, a communication device connected to a image pickup device for photographing a subject comprising intake means for taking in an image from the above image pickup device, communicative means for transmitting the pickup image taken in by the intake means to a transmission destination in communication therewith and control means for starting the operation of the communicative means in response to the image pickup operation is disclosed according to one preferred embodiment of the present invention.

Still further, it is an object of the present invention to provide a communication device available anywhere.

Under this object, it is disclosed according to another preferred embodiment of the present invention that the above communicative means radio-transmits.

Still further, it is another object of the present invention to enhance the availability and economics of communicative means.

Under this object, it is disclosed according to another preferred embodiment of the present invention that the above control means controls the above communicative means so as to make an interruption of communication with a communication destination after the lapse of a given time after the completion of the transmission of the above pickup image.

Furthermore, it is yet another object of the present invention to make the communication device appropriately cope with the communication state of another communicative means.

Under this object, it is disclosed according to yet another preferred embodiment of the present invention that the store means for storing the pickup image obtained from the above image pickup means is further provided, the above communicative means includes detective means for detecting the state of communication with the above transmission destination and the above control means stores the above pickup image once into the above store means on the basis of the detected result by the above detective means.

Furthermore, it is disclosed that, in case of being incommunicable based on the detected result by the above detective means, the above control means once stores the above pickup image into the above store means and the pickup image stored in the above store means is transmitted by the above communicative means in case of becoming communicable.

Furthermore, it is disclosed that the above control means makes a control so as to perform an operation of the above detective means and the above operation based on the detected result in the above detective means in parallel with the ordinary operation.

Besides, it is yet another object of the present invention to provide an image pickup device or a communication method having a novel function or alternatively a storage medium for realizing the function of such a device or method by using a computer.

The other objects and characteristics of the present invention would be apparent from the description of the following embodiments and drawings.

BRIEF DESCRIPTION OF THE DRAWINGS

FIG. 8 is an illustration of Transmission WAIT flags in the above buffer memory;

FIG. 16 is a flow chart for explaining the processing extending from obtaining a pickup image to transmitting it in the above composite device.

DETAILED DESCRIPTION OF THE PREFERRED EMBODIMENTS

Figure 1:
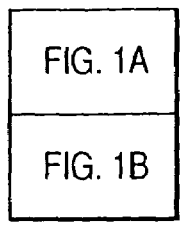
FIG. 1 which is composed of FIGS. 1A and 1B is a block diagram showing the configuration of a composite device according to the present invention with the first embodiment.

Hereinafter, the embodiments of the invention will be described referring to the drawings.

First Embodiment

Figure 1A:
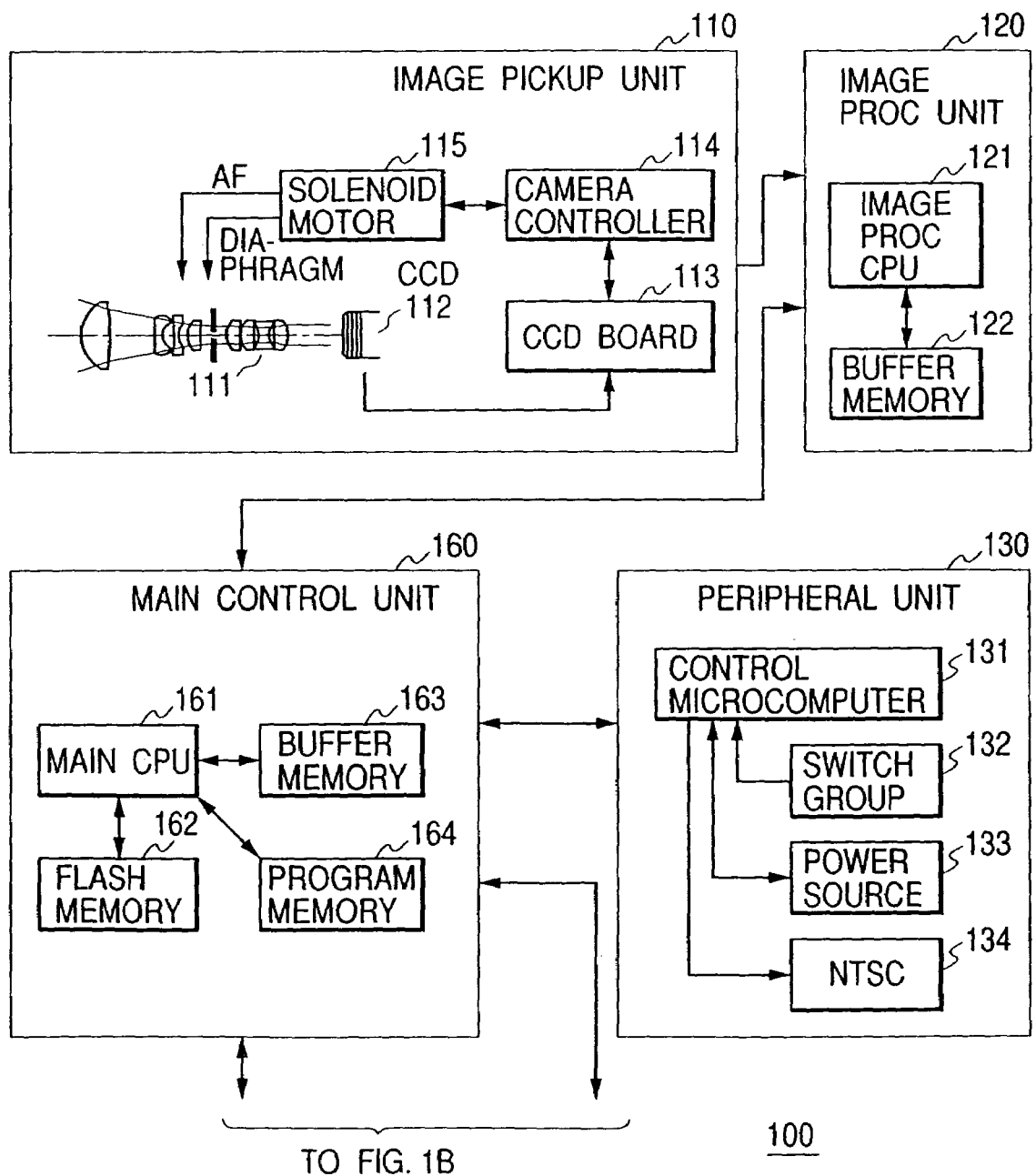
Figure 1B:
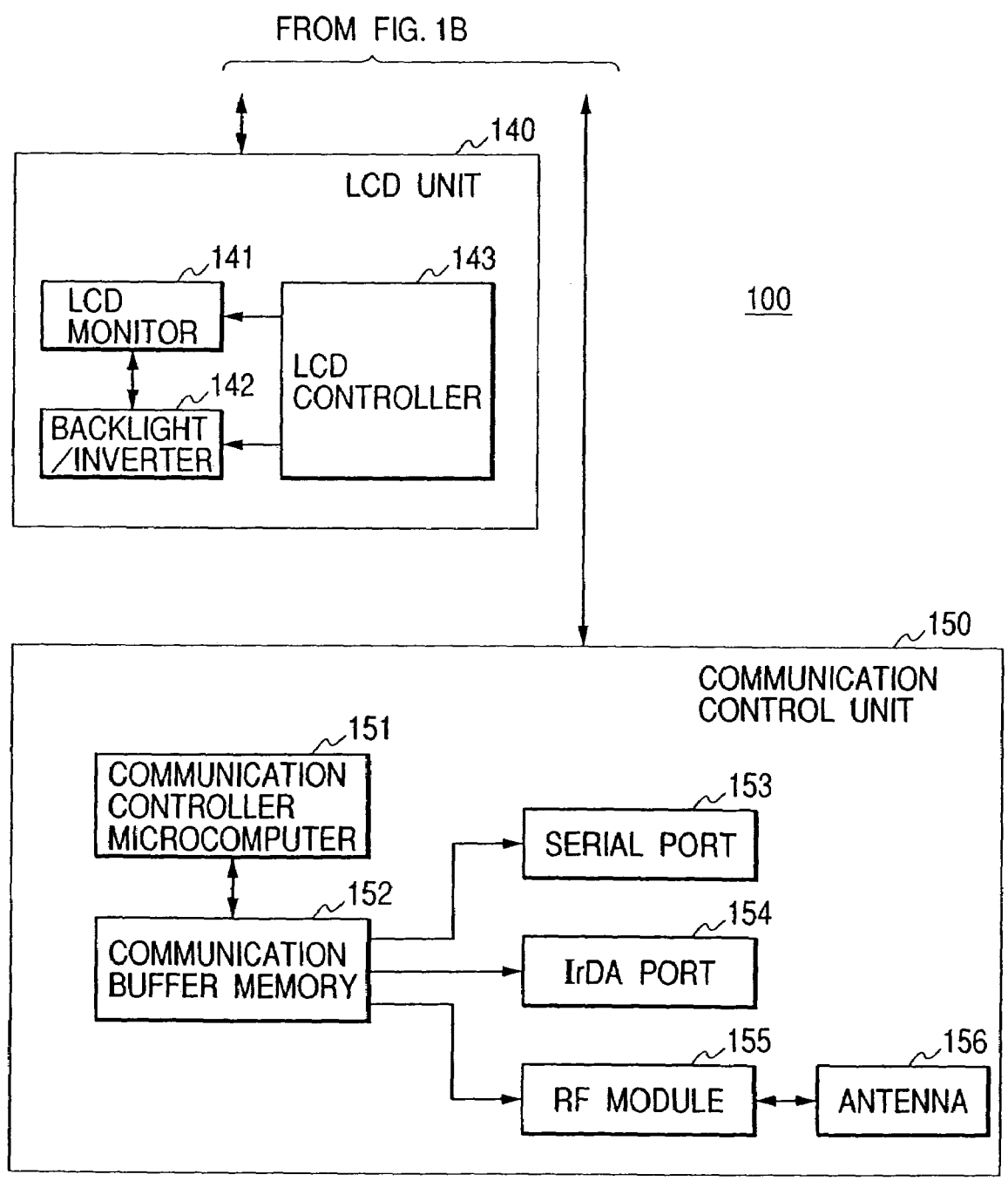

The present invention is applied to a composite device (or multifunctional device) 100 of a pickup device and a communication device, for example, as shown in FIG. 1 (composed of FIGS. 1A and 1B).

Figure 14:
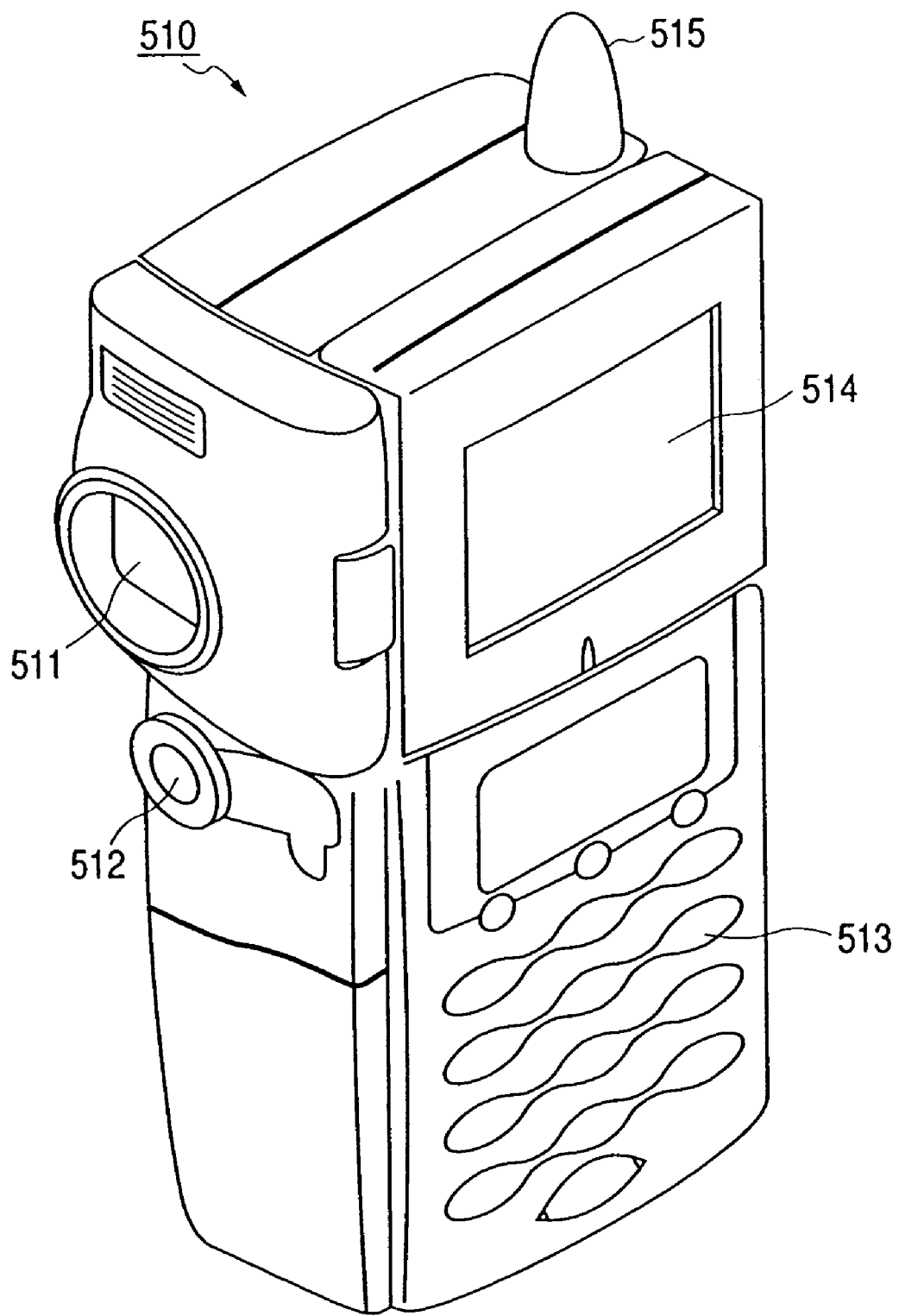
FIG. 14 is an outside view of a composite device of the above pickup device and the above communication device.
Figure 15:
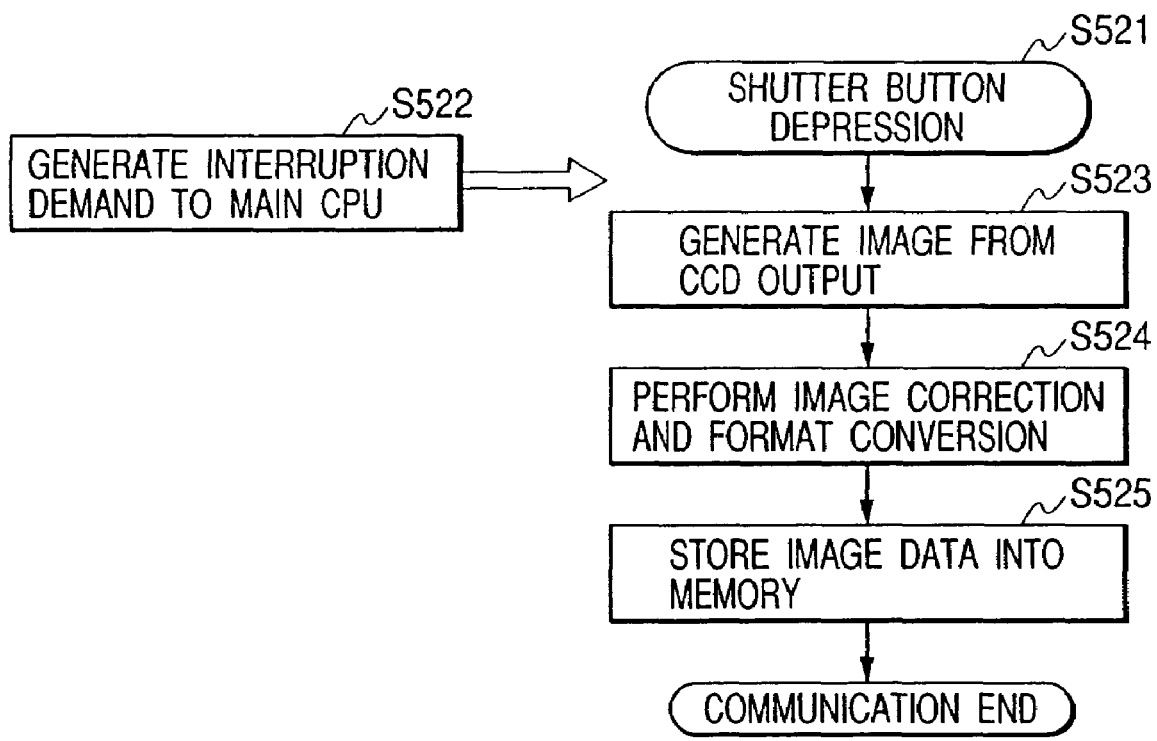
FIG. 15 is a flow chart for explaining the conventional processing from depressing a shutter switch to obtaining a pickup image in the above composite device.

This composite device 100 is similar in external appearance to the former composite device 510 shown in FIG. 14, but differs in a configuration as to change into a certain mode absent in the former composite device 510 by making a given switching manipulation. In this mode, depressing a shutter switch 512 leads to the execution of a photographing operation in the composite device 100 and at the same time the automatic connection of the composite device 100 itself to a public network in such a manner as to transmit a pickup image to a remote place server. Here, the relevant mode is referred to as "direct transmission mode."

Hereinafter, the composite device 100 will be specifically described.

The composite device 100 has the image pickup function of a digital camera or the like and the communicative function of a PHS, a portable phone or the like and comprises an image pickup unit 110, an image processing unit 120, a peripheral unit 130, an LCD unit 140, a communication control unit 150 and a main control unit 160 as shown in FIGS. 1A and 1B.

The image pickup unit 110 comprises a lens unit 111 composed of two lenses or more and a diaphragm, an image pickup element 112 (hereinafter, designated with CCD) for the incidence of a subject ray via the lens unit 111, a solenoid motor 115 for driving the lens unit 111, a CCD board 113 for driving the CCD 112 and a camera controller 114 for controlling the solenoid motor 115 and the CCD board 113. And, the camera controller 114 is so configured as to operate in accordance with the control of the main control unit 160.

The image processing unit 120 comprises an image processing CPU 121 and a buffer unit 122 for accumulating image pickup images obtained in the image pickup unit 110.

The peripheral unit 130 comprises a switch group 132 including various manipulating switches and a shutter switch 512, a power source unit 133 for turning ON/OFF the power source of the composite device 100, an external input/output unit 134 for inputting/outputting an image information item from/to the outside by the NTSC scheme or the like and a controller (control microcomputer) 131 for controlling these.

The LCD unit 140 comprises a color liquid crystal (LCD monitor) 141 (corresponding to the color liquid crystal 514 in FIG. 14), a backlight/inverter 142 of the LCD monitor 141 and a controller (LCD controller) 143 for controlling these.

The communication control unit 150 is so configured as not only to establish the connection to the partner side by call generation/call reception operation determined corresponding to the type of a composite device 100 to a public network but also to deliver image data to a network according to a protocol such as TCP/IP or convert the request from the partner side into a control signal in the composite device 100 for notification.

For this purpose, the communication control unit 150 comprises a communication controller 151 for controlling the communicating operation, a communication buffer memory 152 connected to the communication controller 151, and a serial port 153, an IrDA port 154 and an RF modulator 155 respectively connected to the communication buffer memory 152, and a transmitter/receiver antenna 156 connected to the RF modulator 155.

The main control unit 160 serves to concentrically manage the image pickup unit 110, the image processing unit 120, the peripheral unit 130, the LCD unit 140 and the communication control unit 150 and comprises a main CPU 161, a flash memory 162 for storing pickup images or transmission destination addresses, a buffer memory 163 used for the work region or the like of image processing in the image processing unit 120 and a program memory 164 in which processing programs for various controls or the like are stored in advance. And, the flash memory 162, the buffer memory 163 and the program memory 164 are respectively connected to the main CPU 161.

Figure 2:
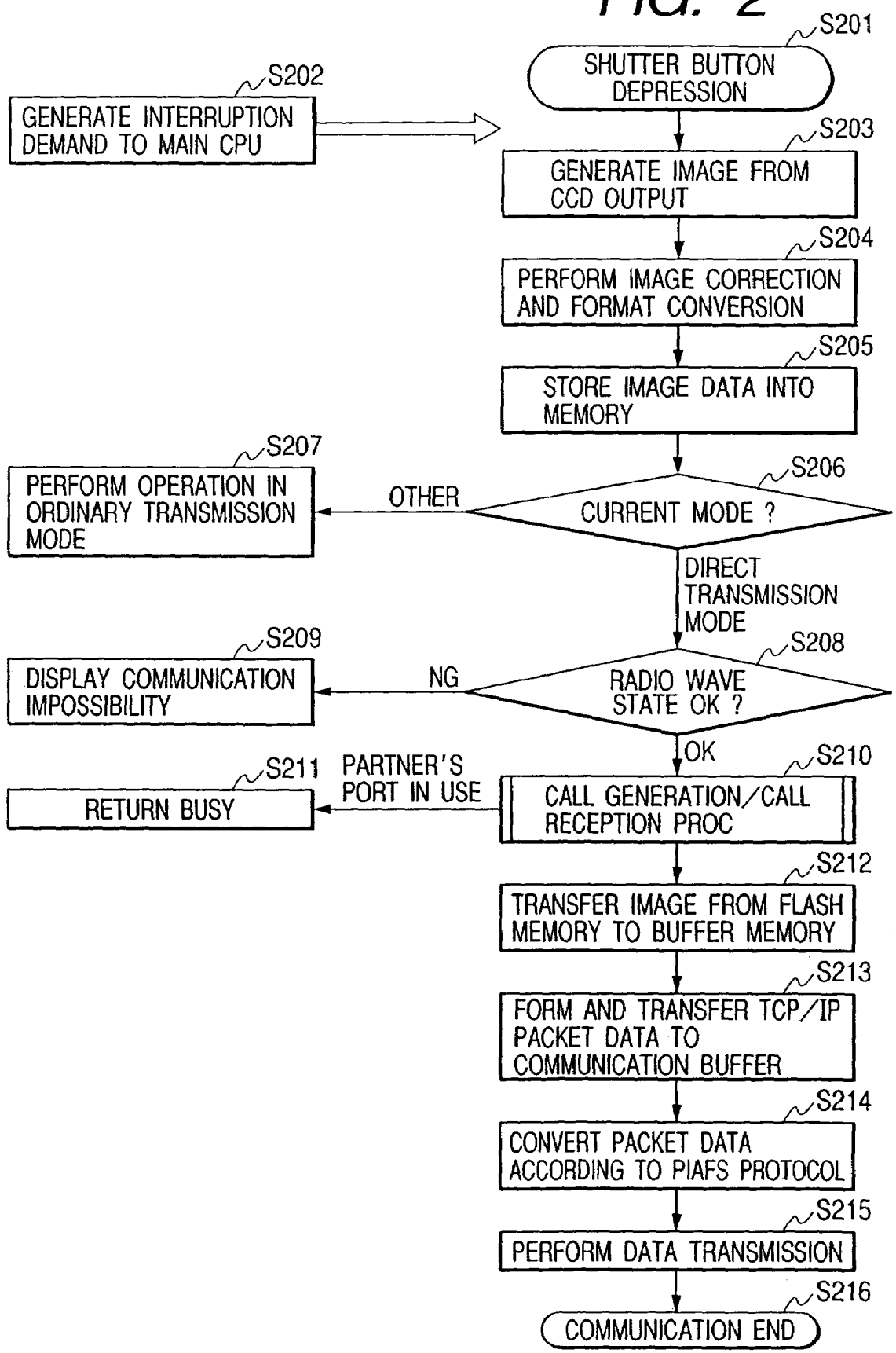
FIG. 2 is a flow chart for explaining the processing extending to the transmission of a pickup image in the above composite device.

With such a composite device 100 as mentioned above, a subject is picked up in the image pickup unit 110 and the processing of the obtained pickup image extending to its transmission to a server is shown in the flow chart of FIG. 2. Hereinafter, this processing will be described.

Incidentally, here, a case where the composite device 100 operates under its most characteristic direct transmission mode will be specifically described.

Besides, in general, the radio transmission via a public network is largely dependent on the surrounding radio wave circumstances or the distance from the neighboring base station, the condition of the composite device 100 itself (standing still or moving) or the like, but here, these changing factors are assumed to be absent for simplicity. Besides, it is assumed that, after the connection to the transmission destination server (hereinafter, abbreviated to destination server) is established, no interruption during the communication occurs.

First, a user sets the composite device 100 to the direct transmission mode by a given manipulating switch in the switch group 132. Correspondingly, a display indicating the direct transmission mode is displayed on the LCD monitor 141. Thereby, the direct transmission of the pickup image becomes easy for a user to recognize.

The manipulation at this time is recognized by the main CPU 161 in the main control unit 160 via the controller 131 in the peripheral unit 130, so that the composite device 100 operates in the direct transmission mode.

Figure 3:
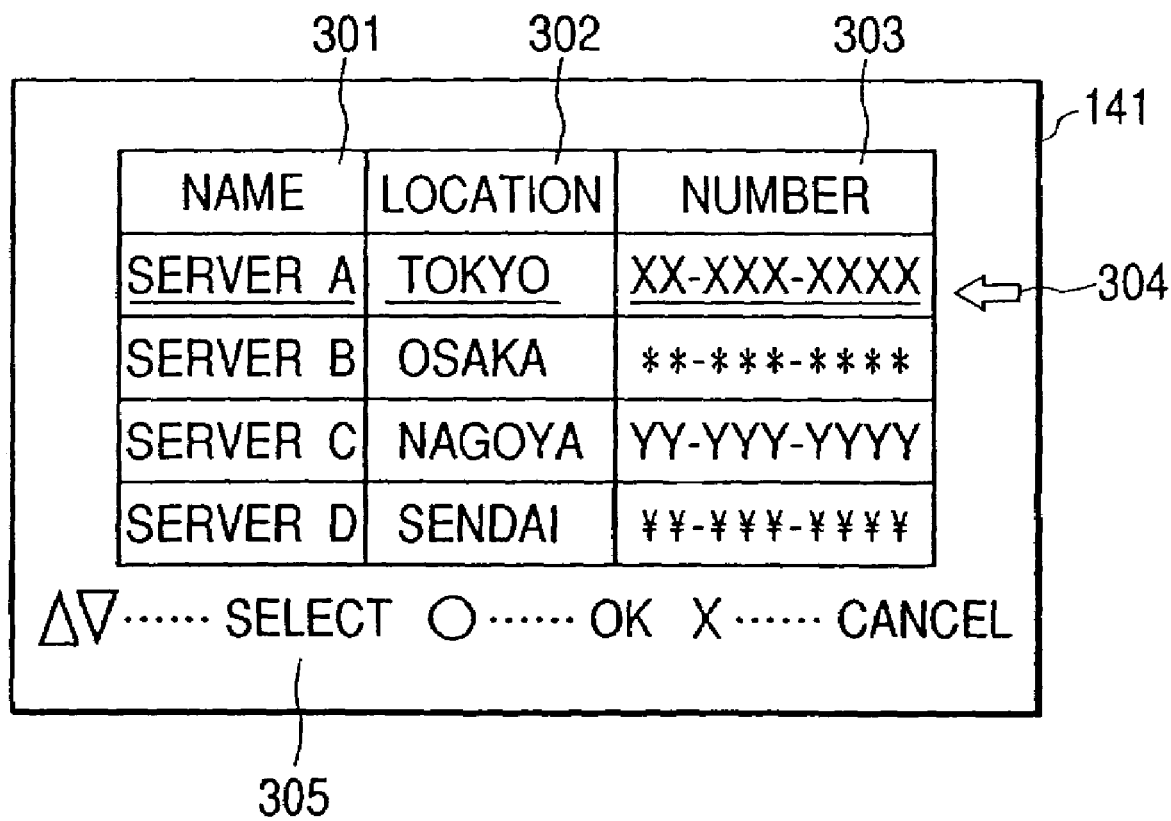
FIG. 3 is an illustration of a screen for selecting a transmission destination server in the above composite device.

Besides, a user selects the destination server from the screen (hereinafter, referred to as "transmission destination selecting screen") displayed in the LCD monitor 141 as shown in FIG. 3. The screen display at this time is performed under control of the LCD controller 143.

Specifically, by manipulating a given manipulating switch in the switch group 132 or the like, a user registers the locations and phone numbers of destination servers (here, designated with server A, server B, server C, server D, . . . ) in advance. This registration information item is stored in the database configured within the flash memory 162 of the main control unit 160 via the controller 131 in the peripheral unit 130. Thus, it is allowed that a registered information item stored in this database is read out and displayed on the LCD monitor 141 as the transmission destination selecting screen.

As shown in FIG. 3, the transmission destination selecting screen comprises a field 301 in which to display the name of a server, a field 302 in which to display the location of a server, a field 303 in which to display the phone number of a server with a user name and a password (not displayed) and moreover a manipulating key unit 305 including a "SELECT" key, an "OK" key and a "CANCEL" key and a curser 304.

On such a transmission destination selecting screen, a user uses various keys of the manipulation key unit 305 and a curser 304 to select and decide the destination server. FIG. 3 shows a condition that the "server A" is selected. Such a manipulation is recognized by the main CPU 161 in the main control unit 160 via the LCD controller 143 in the LCD unit 140.

Incidentally, the above-mentioned process of selecting the transmission destination may be performed after the switchover of the composite device 100 to the direct transmission mode or in another mode set up in advance. In either case, it is assumed that the destination server is selected and decided already before depressing the shutter switch 512. If undecided, this purport is displayed on the LCD monitor 141 and notified to a user, for example, either at the time of switchover to the direct transmission mode or at the time of depressing the shutter switch 512. Or alternatively, by using an alarm sound, it is notified to a user. Besides, when the transmission destination is selected, displaying the transmission destination information together with the operation in the direct transmission mode on the LCD monitor 141 enables a user to take a photograph while recognizing the direct transmission destination and can prevent him from the transmission to an erroneous destination by mistake.

In the above-mentioned manner, the composite device 100 is set to the direct transmission mode and the destination server is selected, then when the shutter switch 512 in the switch group 132 is depressed by a user (step S201), an interruption occurs to the main CPU 161 in the main control unit 160 via the controller 131 in the peripheral unit 130 (step S202).

Thereby, an output signal (pickup image signal) of the CCD 112 in the image pickup unit 110 is taken into the image processing unit 120 (step S203).

In the image processing unit 120, the image processing CPU 121 stores the pickup image signal from the image pickup unit 110 once into the buffer memory 122 and various correction processing is made about brightness, white balance and the like in the image signal. Thereafter, in the main control unit 160, the main CPU 161 makes a format conversion of the pickup image signal subjected to various correction in the image processing unit 120 into the JPEG form or the like and the resultant pickup image data is stored into the flash memory 160 (steps S204 and S205).

Then, in the main control unit 160, the main CPU 161 discriminates to which mode the composite device 100 is set at present (step S206).

If the composite device 100 is found to be set to the direct transmission mode as a result of this discrimination, the following processing from the step S208 is executed.

On the other hand, if the composite device 100 is set to another mode than the direct transmission mode, i.e. to the normal transmission mode, the main CPU 161 makes an operating control of the overall composite device 100 so as to operate according to the flow chart shown in FIG. 16 (step S207).

If the composite device 100 is set to the direct transmission mode, the main CPU 161 in the main control unit 160 examines the current radio wave state via the transmission control unit 150 (step S208).

In case of transmission "OK" as a result of this step S208, the processing from the subsequent step 210 is executed. On the other hand, in case of transmission "NG", the main CPU 161 displays a message indicating that purport (communication impossibility) or the like on the color LCD monitor 143 in the LCD unit 140 (step S209).

Incidentally, at the step S209, instead of the display of communication impossibility, the purport may be notified to a user by using an alarm sound or the like.

If the radio wave state is transmission OK, call generation and call reception to a public network are performed in the composite device 100 as with the steps S537 to S539 shown in FIG. 16 (step S210).

Incidentally, since the flow between this call generation and the public network connection and the process of negotiation with the destination server after the call reception differ in communication method, or use protocol, here, it is simply discriminated whether the destination server responds to the call reception or not. And, if the destination server does not respond to the call reception for a reason that the communication port of the server is in use or so, a message of being busy is returned to the composite device 100. In this case, the main CPU 161 makes an operating control for notifying a message or the like indicating the purport (communication impossibility) to a user by using the display on the color LCD monitor 143 of the LCD unit 140, an alarm sound or the like (step S211). Thus, only if the call reception and negotiation proceeds normally and the communication between the composite device 100 and the transmission destination server is established, the processing steps from the next step S212 are executed.

When the communication between the composite device 100 and the destination server is established by the call generation and call reception at the step S210, the main CPU 161 in the main control unit 160 transfers the pickup image data within the flash memory 162 once to the buffer memory 163 (step S212).

And, the main CPU 161 decomposes the pickup image data within the buffer memory 163 (assumed to be image data of JPEG type) into packets according to a protocol such as TCP/IP and supplies those packet data to the communication unit 150 (step S213).

In the communication unit 150, the communication controller 151 converts the packet data from the main control unit 160 in accordance with the procedure determined corresponding to the type of a composite device 100 (here, assumed to be a transmission control procedure such as "PIAFS") and stores the packet data after this conversion into the communication buffer memory 152 (step S214).

After converted into a frequency band adapted to the device by means of the RF module 155, the packet data within the communication buffer memory 152 are transmitted to the base station via the antenna 156 and transmitted to the destination server through a public network (step S215).

In the server that received this, the pickup image is restored through the procedure reverse to the above in the composite device 100.

After the transmission of the packet data (pickup image data) within the communication buffer memory 152 ends, the main CPU 161 on the main control unit 160, having recognized this end, issues a request for disconnection to the communication controller 819 in the communication unit 150. Thereby, as with the above processing at the call generation, the communication controller 819 makes a communication end processing in accordance with the specified procedure (step S216).

As mentioned above, in this embodiment, since the direct transmission mode is so configured as to be set up in which a communication with the remote place server via a public network is automatically made at once after the shutter switch 512 depressed and pickup images are automatically transmitted if the communication with the server is executable, a user can transmit the pickup image obtained by photographing to a desired server at once only by a simple manipulation of changing the mode of the composite device 100 into the direct transmission mode. Thus, every time of pickup image transmission, a user need not repeat the selection of a transmission image, the mode change to direct transmission mode, the selection of a destination server or like operations unlike former devices.

Incidentally, if the above composite device 100 is applied to the relay use or the like, i.e. if no pickup image always needs to be stored in the composite device itself 100, the process of write in the flash memory 162 and read from the flash memory 162 to the buffer memory 163 at the steps S205 and S212 in FIG. 2 is unnecessary.

In such cases, for example, assuming that the buffer memory 163 is configured by a speedier buffer memory and images after the image pickup is so configured as to be transmitted to a server directly through the communication unit 150, the memory region for image storage in the composite device 100 can be effectively used without waste.

Second Embodiment

In addition to the configuration of the first embodiment, this embodiment is so configured that in the direct transmission mode, the call generation and call reception processing is skipped if the time taken from a first depression of the shutter switch 512 to a second depression of the shutter switch 512 lies within a given period of time.

Figure 4:
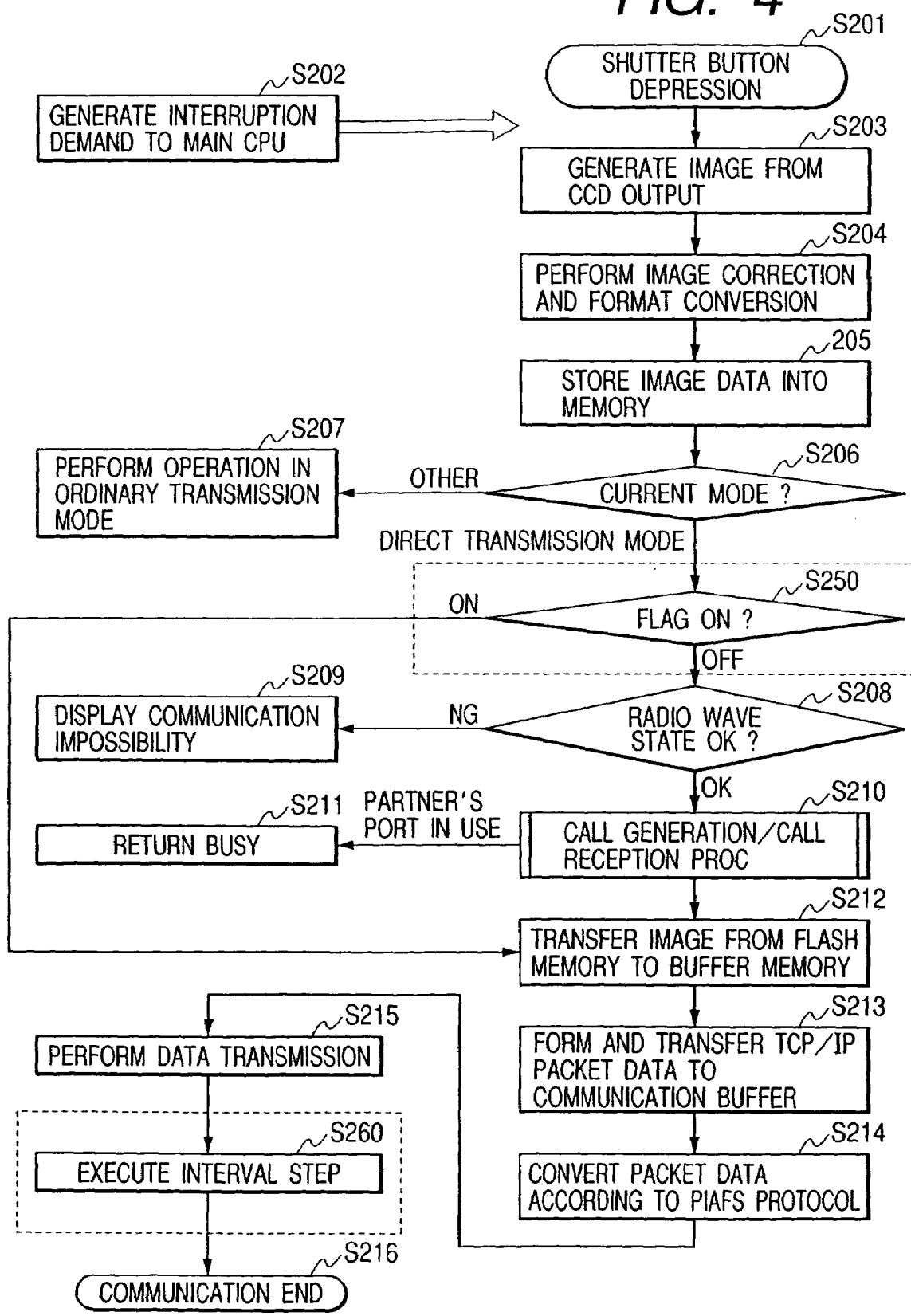
FIG. 4 is a flow chart for explaining the processing extending to the transmission of a pickup image in the above composite device with the second embodiment.

The processing of this case from the pickup of a subject to the transmission of the pickup image to a server in a composite device is shown in the flow chart of FIG. 4.

Incidentally, in the flow chart of FIG. 4, like symbols are attached to steps for executing a processing similar to that of the flow chart of FIG. 2 and their detailed description will be omitted. Here, a specific description will be made only of a configuration different than the first embodiment.

First, when a first depression of the shutter switch 512 is made, a pickup image is obtained as mentioned above and the present mode of the composite device 100 is discriminated to be the direct transmission mode (step S206), it is discriminated whether the flag is "ON" or not thereafter (step S250).

This flag (discrimination flag) is, for example, an inner flag of the main CPU 161 in the main control unit 160 and is set to "ON" or "OFF" in the interval step mentioned below of the step S270. And it is configured that, if this discrimination flag is "ON", the step S208 to the step S210 are canceled and the processing steps from the next step S212 are executed.

Here, since the first depression time of the shutter switch 512 is discussed, the discrimination flag is "OFF." Thus, in the above-mentioned manner, the call generation and call reception processing according to the steps of S208 to S210 is carried out and the transmission of a pickup image to the server is executed if communication with the destination server is possible (step S215).

Figure 5:
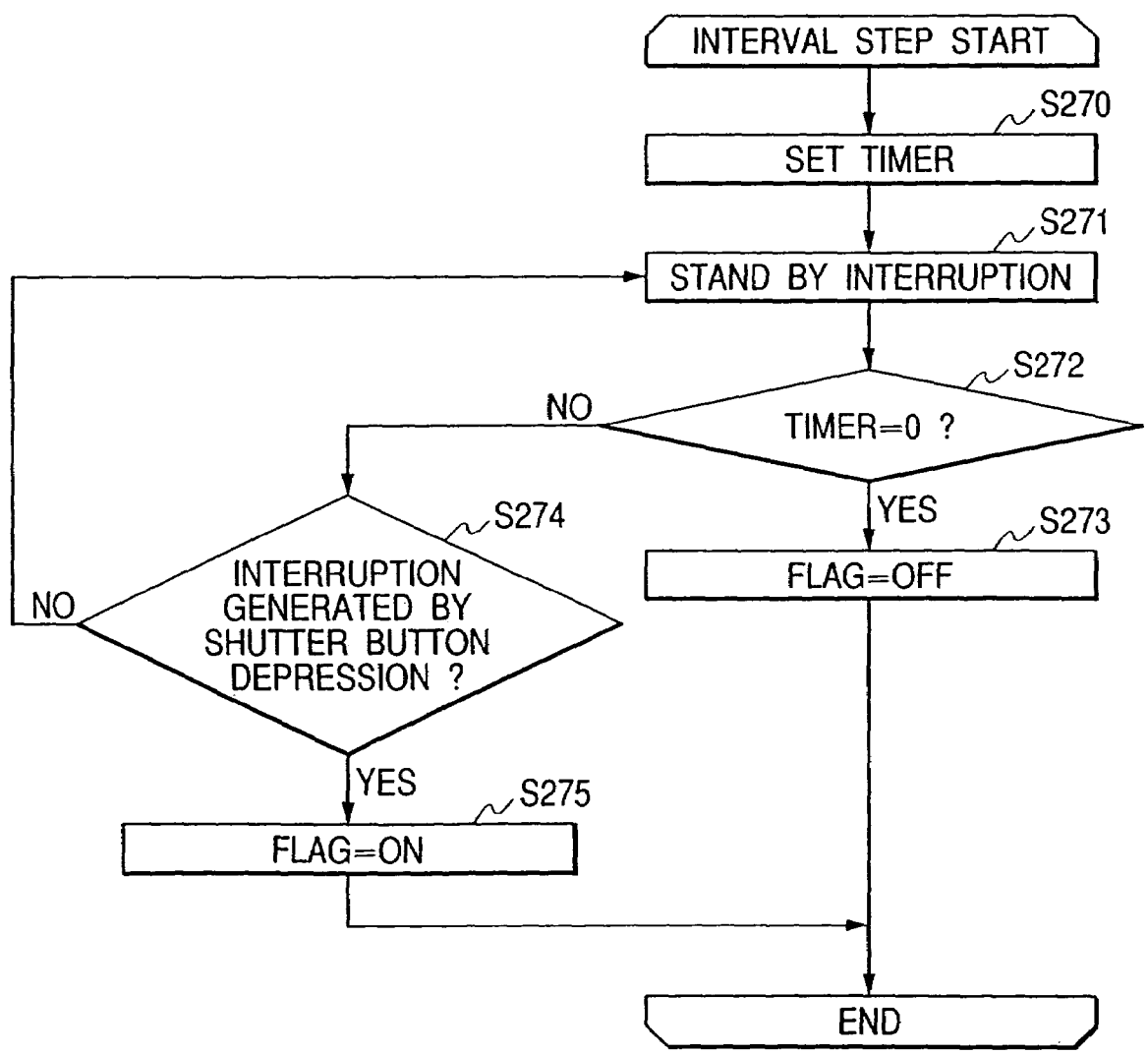
FIG. 5 is a flow chart for explaining the detail of an interval step processing in the above processing.

Then, in the interval step of the step S270, processing according to the flow chart of FIG. 5 is carried out.

Namely, in the main control unit 160, first, the main CPU 161 sets the timer for a predetermined period of time inside of it (step S270) and keeps waiting while monitoring the occurrence of an interruption by a depression of the shutter switch 512 at the step S202 (step S271).

Next, the main CPU 161 discriminates whether a value of time becomes "0" or not (step S272) and the discrimination flag is set to "OFF" if a value of time is 0 (step S273). Thereafter, this processing ends.

On the other hand, if a value of time does not reach 0, the main CPU 161 discriminates whether an interruption due to a depression of the shutter switch 512 has occurred (step S274). If an interruption occurs as a result of this discrimination, the main CPU 161 set the discrimination flag to "ON" (step S275). Thereafter, this processing ends. Besides, if no interruption occurs, the procedure returns to the step S271 and the interruption waiting state appears.

Accordingly, when the shutter switch 512 is depressed at a second time within a predetermined time set up on the timer inside the main CPU 161 from the first depression of the shutter switch 512, the processing from the above-mentioned step S201 is carried out in the "ON" state of the discrimination flag and the discrimination of the step S250 cancels the call generation and call reception at the steps of S208 to S210, so that the transmission processing of a pickup image from the step 212 is executed as it stands.

Besides, when the shutter switch 512 is depressed at the next time after the lapse of a predetermined time set up on the timer inside the main CPU 161 from the first depression of the shutter switch 512, the processing from the above-mentioned step S201 is carried out in the "OFF" state of the discrimination flag and the discrimination of the step S250 permits the call generation and call reception at the steps of S208 to S210 to be executed as done during the first depression of the shutter switch 512, so that the transmission processing of a pickup image from the step 212 is executed.

As mentioned above, this embodiment is so configured that the interval is provided only during a predetermined time after the end of pickup image transmission to the transmission break.

Setting of a timer in the main CPU 161 for this purpose is considered in various ways depending on uses or circumstances, but its matching to the unit charging time of a network connection fee can suppress the occurrence of a wasteful fee, for example, from the viewpoint of economics.

Figure 6A:
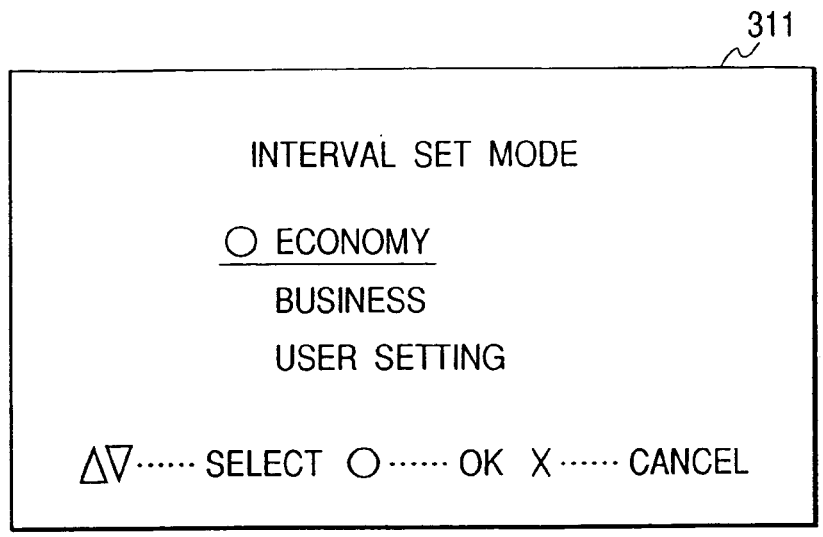
FIGS. 6A, 6B and 6C are illustrations of screens for the setup of the above intervals.
Figure 6B:
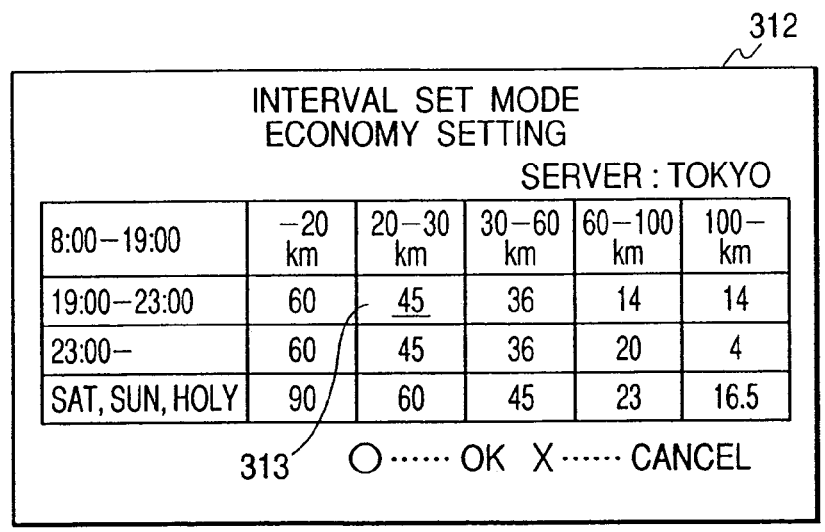
Figure 6C:
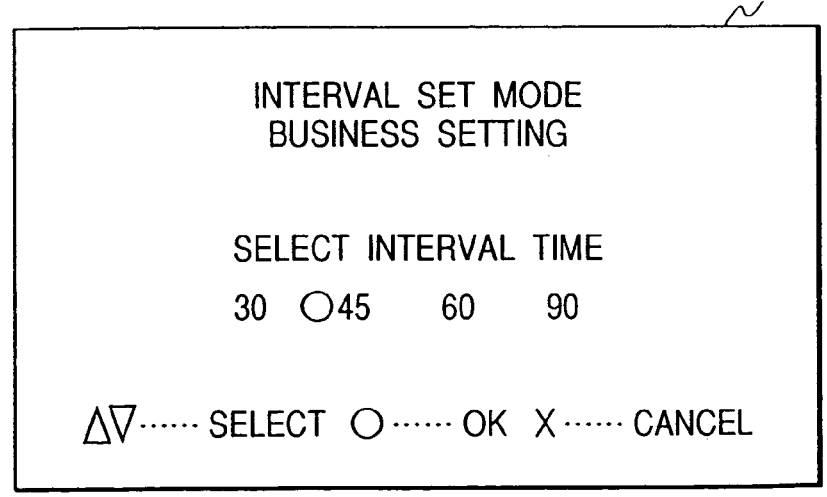

Such being the case, FIGS. 6A, 6B and 6C show one example of spacing setting screen of the above interval. The display of these screens is performed under control of the LCD controller 143 over the LCD monitor 141 in the LCD unit 140.

In FIGS. 6A, 6B and 6C, the first setting screen 311 is so configured that any one of economy priority mode (ECONOMY), business emphasis mode (BUSINESS) and user manual setting mode (USER SETTING) is selectable corresponding to the uses of a user. Here, the screen state is shown in which a user selects the economy priority mode (ECONOMY).

The next setting screen 312 is a screen at the time of selecting the economy priority mode (ECONOMY) and is so configured that a user can confirm the list of the minimum charging second in communication fee depending on the time and district and can instruct "OK" or "CANCEL." The numeral "45" indicated by the arrowhead 313 in FIG. 6B is the minimum charged seconds extracted from the present time and the relative distance between the destination server and the composite device 100 and it is configured in the economy priority mode (ECONOMY) that the interval spacing is set at this "45" seconds.

Incidentally, in the case of using a mobile for the communicative function of a composite device 100, the position of the personal set is not definite and the relative distance to the server varies, so that at this time a user previously set a rough position, for example. Besides, in the case of using a PHS, a change in distance is automatically coped with by using the position information of CS.

On the other hand, the setting screen 314 is a screen at the time of selecting the business emphasis mode in which the availability and instantaneous response is thought more of than the economics and is so configured that a user can set the interval spacing with the interval kept always constant independently of the destination server.

Incidentally, in this mode, to enhance the instantaneous response, it is advisable to send out data directly from a buffer memory 163 without writing data into a flash memory 162 as mentioned above.

Meanwhile, the time of selecting the user manual setting mode is shown in no drawing, but based on a screen taking an intermediate form between the above-mentioned setting screens 312 and 314, it is so configured as to be selectable as a user likes to set the interval time a little longer in the same district, to set the interval time a little earlier in a far district or to change the setting depending on the destination server, for example.

According to this embodiment as mentioned above, if another pickup image is transmitted at once after the completion of transmitting a certain pickup image in the direct transmission mode, the connection to a public network is not broken so long as the elapsed time is within the above interval time, so that the preprocessing required at the time of a normal connection (recalling to a public network, negotiation, connection processing to the destination server and the like) can be automatically skipped.

Thus, the preprocessing for the connection to a public network taking much time can be omitted and the image transmission can be effectively carried out. Furthermore, missing the shutter chance occurring continuously can be prevented.

Besides, an appropriate selection of the interval time permits the compatibility between economics and instantaneous response. Incidentally, in the above description, measuring the time of the interval starts after the transmission end, but it is more economic from the viewpoint of the fee system that a fee is charged at each lapse of a definite time after the transmission start to break the communication directly before the charging. For this purpose, it is effective to judge the break of communication at each lapse of a definite time after the transmission start.

Third Embodiment

In the first embodiment, as shown in FIG. 2, it is configured if the radio wave state is bad and the transmission is impossible or unstable (in case the result of discrimination at the step S208 is "NG") when a subject is picked up in the image pickup unit 110 and transmission instruction is made in the direct transmission mode during the processing extending to the transmission of the obtained pickup image to a server that a message or the like of communication impossibility is displayed on the color LC 143.

Such being the case, in this embodiment, pickup images to be transmitted (untransmitted images) are stored once in a memory, the transmission state returns to the photographic state before the completion of the transmission processing for untransmitted images and the untransmitted images stored in the memory are automatically retransmitted when the radio wave state is stabilized.

Configuring the hardware and software for implementing this makes it unnecessary that a user waits for the recovery of the radio wave state, prevents the impossibility of photographing before the completion of transmission and makes unnecessary the movement to a place where the radio wave state is good for the transmission, so that photographing becomes possible even before the radio wave state is recovered. In other words, a user becomes free of the photographic obstruction due to a bad radio wave state and can take a photograph smoothly.

Hereinafter, one example of configuration of this embodiment will be specifically described.

First, with respect to a hardware configuration, this is fundamentally the same configuration as that shown in FIGS. 1A and 1B, but the capacity of a buffer memory 163 in the main control unit 160 is made greater than that of a configuration according to the first embodiment. This is because the buffer memory 163 is further used as an image data buffer for storing untransmitted images in this embodiment whereas it is chiefly used as a work area attendant on the main CPU 161 in the first embodiment.

Here, the reason of using a buffer memory 163 rather than a flash memory 162 as the memory for storing the untransmitted image once is that a speedier access is possible for the buffer memory 163 than for the flash memory 162 and the time taken till the release of a device (restoration to the photographing state) can be shortened by this speed. Besides, the buffer memory 163 is not necessarily used only for the image transmission but also as a simple image buffer, and accordingly becomes effective as a so-called snapshot buffer.

Incidentally, the description of the reason for the use of the above buffer memory 163 means that to use the buffer memory 163 is better than to use the flash memory 162 and as a matter of fact, does not denies the use of the flash memory 162. Namely, if the flash memory 162 low in unit capacity price is employed as the memory for storing untransmitted images once, more time is required for the storing an untransmitted image into the flash memory 162 but a merit of being capable of storing more imaged cannot be disregarded.

Besides, here, a buffer memory 163 or a flash memory 162 is used as the memory for storing untransmitted images once, but the present invention is not limited to this. For example, a dedicated memory for storing untransmitted images once may be provided.

Figure 7:
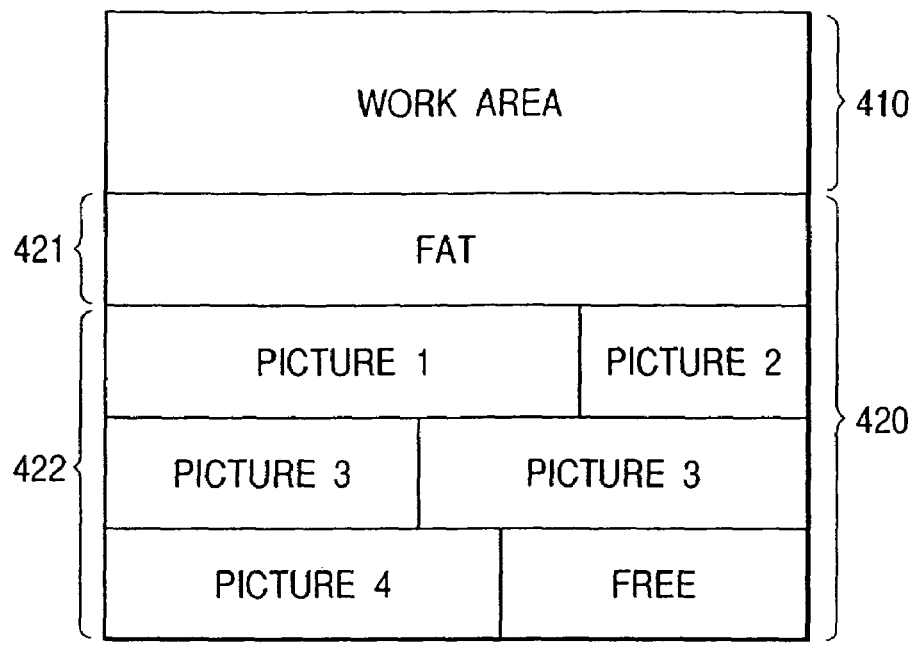
FIG. 7 is an illustration of the memory map of a buffer memory in the composite device for storing the pickup image once in case of being incapable of pickup image transmission in the third embodiment.

Such being the case, a buffer memory 163 here is made up of different areas as shown in the memory map of FIG. 7.

To be specific, the buffer memory 163 is broadly divided into a work area 410 and a data area 420 as shown in FIG. 7.

The work area 410 is a memory area used the packing, unpacking or the like of images as described in the first embodiment and its fundamental uses are similar also in this embodiment.

The data area 420 is a memory area added in this embodiment for continuously and speedily storing the photographed images (photographic image) converted into a given format in the work area 410 within the capacity of the relevant memory.

The data area 420 is further divided into a memory area 421 for storing a file administrating table (FAT) and the like and a memory area 422 for storing image data and the like.

In the memory area 421, as shown in FIG. 8, for example, information items of various image files (photographic images) gather. In addition to the information content comprising serial numbers 431, final updated dates 432, start addresses 433 and end addresses 434, photographic data 435 such as photographic resolution, shutter speed and diaphragm are stored as those peculiar to an image pickup device.

In particular, it is characteristic here that one transmission WAITING flag 435a is added to each of photographic images in the zone of photographic data 435.

This transmission WAITING flag 435a is added in the direct transmission mode but ignored in the other modes, thus yielding priority to the ordinary processing as the photographic buffer. Thus, transmission WAITING flags 453a vary with radio wave states of photographing instances in the direct transmission mode.

Figure 9:
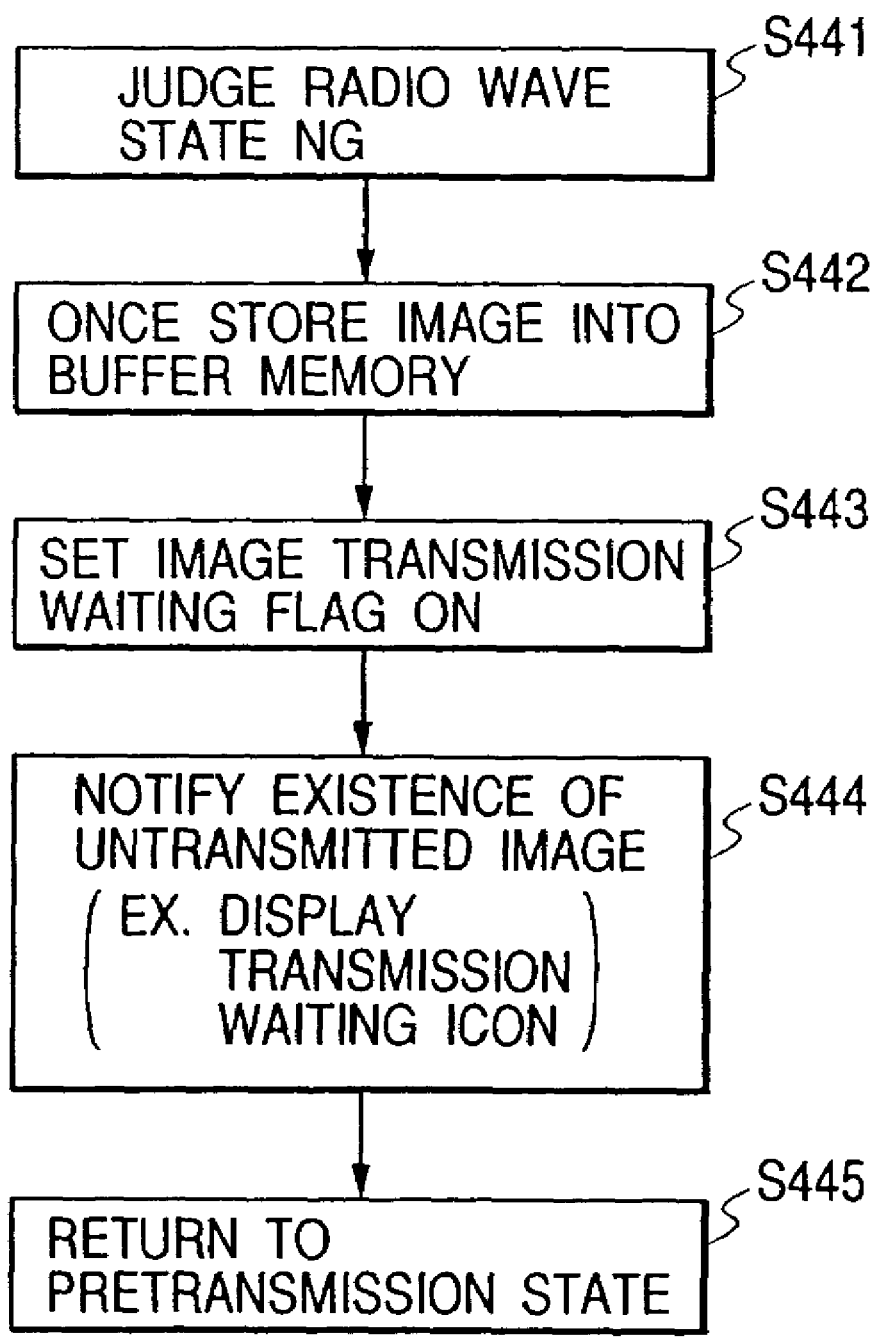
FIG. 9 is a flow chart for explaining the processing of setup to the above Transmission WAIT flag.

FIG. 9 is a flow chart showing the processing of setting to the above transmission WAITING flag 435a. This setting processing is executed, for example, by the main CPU 161.

First, in the processing shown in FIG. 2, if the radio wave state is NG at the time of image transmission as a result of discrimination at the step S208 (step S441), the pickup images stored in the flash memory 162 are once copied to the data area 420 of the buffer memory 163 (step S442).

Incidentally, this step processing comes directly after the photographing and is not limited to this before pickup images are stored into the flash memory 162.

Next, the transmission WAITING flag 435a corresponding to the pickup images copied to the data area 420 of the buffer memory 163 at the step S442 is set to "ON" (step S443).

And, using functions mentioned later pertaining to a composite device 100, the presence of transmission WAITING images (untransmitted images) is notified to a user (step S444) and immediately this transmission state returns to the photographing possible ordinary state (step S445).

As examples of functions pertaining to a composite device 100 which were mentioned at the above step S444, a function to display how many untransmitted images remain on a color LC 143 by using icon(s), a function to blink the provided LED while untransmitted images remain or the like are considered.

Here, as one example thereof, a function to display the presence or absence of untransmitted images remaining on a color LC 143 by using icon(s) is used.

Figure 10:
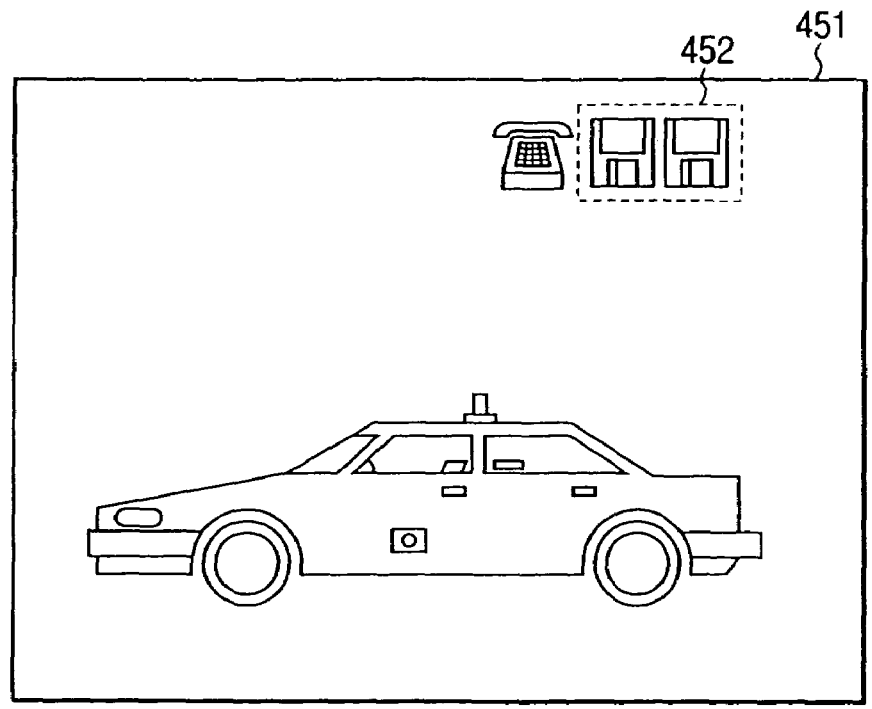
FIG. 10 is an illustration of one example of function for notifying a user about the presence of a Transmission WAIT screen.

According to this function, on the color LC 143, as shown in FIG. 10, two icons indicating that two untransmitted images remain are displayed at the upper zone 452 of the area 451. These icons change in the state of untransmitted images, and the number of icons increases as untransmitted images increase. And if the relevant untransmitted image is been transmitted, the state of each untransmitted image is notified to a user by changes such as blinking or the like.

As mentioned above, here, since it is configured in case of a bad radio wave state and transmitting impossibility or instability that untransmitted images are stored once in the buffer memory 163 and the transmission state returns to the photographic state before the completion of the transmission processing for untransmitted images, a user can keep taking a photograph smoothly even in case of a bad radio wave state.

The untransmitted images stored in the buffer memory 163 are automatically retransmitted when the radio wave state is recovered.

Figure 11:
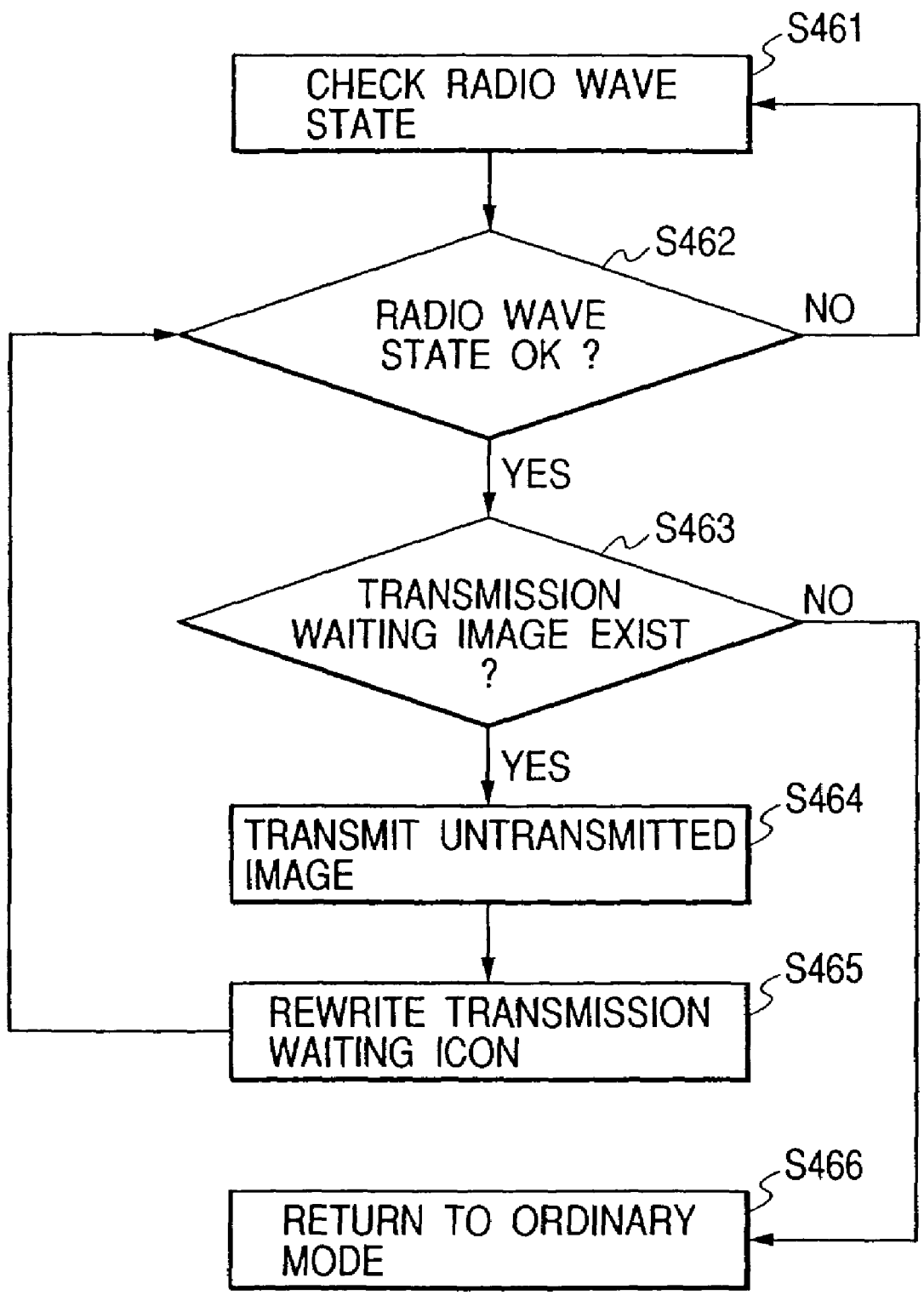
FIG. 11 is a flow chart for explaining the processing for the automatic transmission in case of becoming capable of communicating the pickup image stored once in the above buffer memory.
Figure 12:
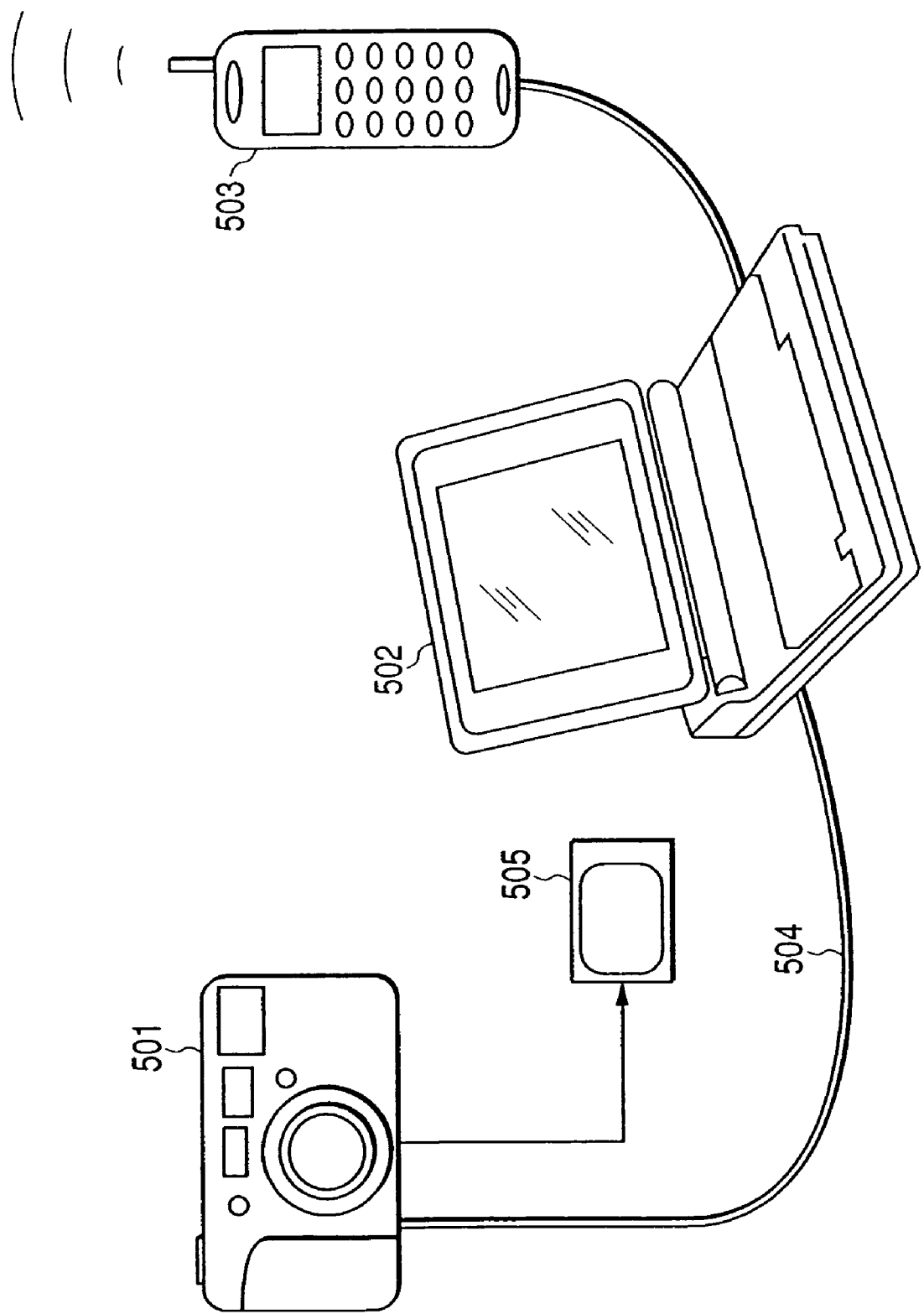
FIG. 12 is an illustration of a conventional method for radio-transmitting the pickup image obtained in a pickup device by means of a communication device.
Figure 13:
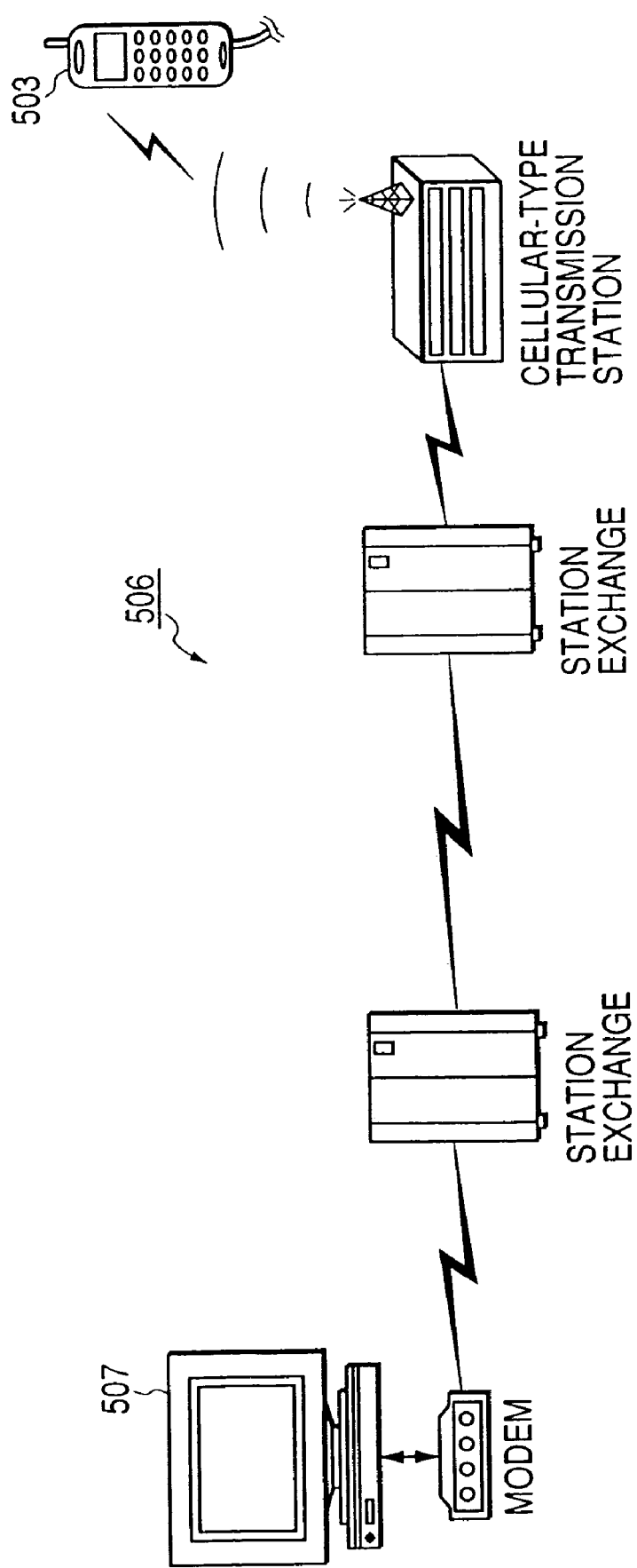
FIG. 13 is an illustration of the situation of a pickup image being transmitted to a server by means of the above communication device.

Accordingly, as mentioned above, the communication control unit 151 for monitoring the radio wave state always exchanges an information item about the radio wave state with the main CPU 161 and the main CPU 161 discriminates on information items from the communication control unit 151 whether the communication is possible or not, whereas further in this embodiment, the main CPU 161 monitors the respective transmission WAITING flags 435a provided for individual pickup images stored in the buffer memory 163 and automatically executes a transmission processing as shown in FIG. 11 at the background at the time when the radio wave state becomes communicable if even one of the transmission WAITING flags 435a indicating transmission WAITING images (images of flag="ON") remain.

In the above transmission processing, first, the communication control unit 151 checks the radio wave state (step S461), discriminates whether the radio wave state is recovered (step S462) and issues an interruption demand to the main CPU 161 if recovered.

Incidentally, if the radio wave state has not yet been restored as a result of discrimination at the step S462, the communication control unit 151 keeps on checking the radio wave state as it is.

By check of the above-mentioned transmission WAITING flags 435a for individual pickup images after receiving the interruption from the communication control unit 151, the main CPU 161 discriminates whether transmission WAITING images (images of flag="ON") remain or not (step S463).

If no transmission WAITING image (image of flag="ON") remains, i.e. if all transmission WAITING flags 435a are "OFF", as a result of discrimination at the step S463, the transmission processing returns to the ordinary processing as it is (step S466).

On the other hand, if transmission WAITING images (images of flag="ON") remain as a result of discrimination at the step S463, the main CPU 161 proceeds to the multi task mode by the pause or division of the processing in execution (step S464).

This multi task mode is a mode of performing a transmission processing of untransmitted images in parallel with the processing of ordinary photographing, perusal and the like. As methods for implementing this, various methods are considered depending on the type of a CPU, a hardware configuration and software configuration.

And, at the time of transmission end of an untransmitted image, the main CPU 161 sets the transmission WAITING flag 435a corresponding to the relevant image to "OFF" by the processing of the step S464.

Besides, simultaneous to this, the main CPU 161 executes the processing of eliminating one of the icons indicating the presence of untransmitted images on the color LC 143 as shown in FIG. 10 from the relevant screen (step S465).

After the processing of the step S465, the processing from the step S462 is again executed. Namely, the processing at the steps of S462 to S465 are repeated and executed till all transmission WAITING flags 435a provided for individual pickup images stored in the buffer memory 163 becomes "OFF."

Accordingly, the above processing configuration enables a user to continue photographing regardless of any radio wave state. Thus, according to the third embodiment, the effect that the convenience can be enhanced is obtained in addition to that of the first embodiment.

Incidentally, in the above description, a composite device in which image pickup means and communicative means are integrated is used, but the present invention may be so configured as to connect a communication device to an image pickup device through a cable or the like. In this case, if no communication device is necessary, for example, it is only necessary to carry image pickup means alone and therefore the necessaries to be carried are light in weight.

Needless to say, the purpose of the present invention is attained also by supplying a storage medium to the system or device in which the program codes of the software for implementing the function of the host and terminal in the individual embodiments mentioned above are stored and allowing the computer (or CPU or MPU) of the system or device to read and execute the program codes stored in the storage medium.

In this case, the program codes themselves read from the storage medium implements the function of each embodiment and the storage medium in which the program codes are stored constitutes the present invention.

As storage media for supplying a program code, ROM, a floppy disk, a hard disk, an optical disk, a photomagnetic disk, a CD-ROM, a CD-R, a magnetic tape, a nonvolatile memory card and the like can be used.

Besides, needless to say, not only the function of each embodiment is implemented by executing the program codes read out by a computer but also a case where an OS or the like operating on the computer performs a part or the whole of an actual processing based on the instruction of the program codes and the function of each embodiment is implemented by the relevant processing is also included.

Furthermore, needless to say, a case where a program code read out from a storage medium are written into an extended function board inserted in a computer or a memory provided on an extended function unit connected to a computer, then based on the instruction of the program code, a CPU or the like provided on the extended function board or the extended function unit performs a part or the whole of an actual processing and the function of each embodiment is implemented by the relevant processing is also included.

In the present invention, as described above, an image pickup operation and a communication with a specified transmission destination (such as radio transmission) is started on the basis of the instruction of a predetermined operation given from a user. Thereby, the pickup images obtained by the image pickup operation are automatically transmitted.

Besides, at this time, after the lapse of a predetermined time (a definite interval) from the end of transmission to a specified transmission destination, a break of communication with the transmission destination (release of connection to the communication network) is made.

Specifically, when a predetermined operation with a manipulating switch is performed by a user, for example, the operating mode of this device is switched to a predetermined mode. On depressing a shutter switch, this device under the predetermined mode starts an image pickup of a subject and moreover makes a call generation of radio transmission with a preset transmission destination (starts an image pickup operation and a communicating operation at the same time). Thereby, the pickup images obtained by an image pickup are automatically transmitted to a preset transmission destination.

According to such a configuration, a user can simultaneously send the pickup images obtained by photographing to a desired transmission destination only by a simple manipulation of switching the operating mode of a device to a predetermined mode.

Thus, unlike a former case, a user need not to repeat and perform the processing of selection of a transmission image, mode change to the transmission mode, selection of a transmission destination and the like each time of transmitting a pickup image. Consequently, even in case of a successive transmission during the continuous photographing or the like, an effective transmission of pickup images can be carried out without once interrupting the photographing and without missing the shutter chance.

Besides, after the end of transmission of pickup images to a transmission destination, the communication with the destination is not simultaneously broken and is terminated with a definite interval provided in the meantime. Thereby, if a shutter switch is depressed within the definite interval, a transmission of the next pickup image is made not through the call generation processing performed again.

According to such a configuration, in case of transmitting another pickup image directly after the end of transmission of a certain pickup image, the preprocessing (recall generation to a public network and negotiation, processing of connection to a destination server and the like) required at the time of the ordinary connection can be automatically skipped because the connection to the public network is not broken within the above interval time.

Thus, the preprocessing of the connection to a public network, generally taking much time, can be omitted and an image transmission can be effectively made. This is especially effective at the time of continuous photographing and missing any continuously occurring shutter chance can be prevented.

Furthermore, the selection of an interval permits either the economics priority or the instantaneous response priority to be selected.

Besides, if the communication state (radio wave state for wireless transmission) is unsuitable to the communication in transmitting pickup images to a destination server (when an instruction of transmission was made), a configuration of once storing the pickup images (untransmitted images) into a memory enables a user to continue a smooth photographing without need of waiting till the radio wave state is recovered and without need of moving to a place of a good radio wave state even for a bad radio wave state. Furthermore, if it is configured that the pickup images stored once in a memory are automatically transmitted when the radio wave state is restored to a state suitable for the communication, the convenience is enhanced.

Thus, to continue photographing regardless of any radio wave state becomes possible and the convenience can be further enhanced.

What is claimed is:

1. An image pickup device having a communicative function to transmit pickup images obtained of a subject, comprising:
    an image pickup unit adapted to obtain a pickup image by photographing said subject;
    a manipulative unit adapted to instruct a predetermined operation;
    a communicative unit adapted to transmit said pickup image obtained by said image pickup unit to a transmission destination; and
    a control unit adapted to start an operation of said communicative unit when said predetermined operation is instructed by said manipulative unit,
    wherein said control unit controls said communicative unit so as to make a break in communication with said transmission destination after a lapse of a predetermined time period from a time when transmission of said pickup image was completed, and
    wherein said control unit sets as said predetermined time period a time period that differs according to a situation of said image pickup device.

2. An image pickup device according to claim 1, further comprising:
    a store control unit adapted to store said pickup image obtained by said image pickup unit into a memory; and
    a detecting unit adapted to detect a state of communication with said transmission destination, wherein said control unit stores said pickup image into said memory based on a detection result obtained by said detecting unit.

3. An image pickup device according to claim 1, wherein, in a case of being incommunicable as determined based on said detection result obtained by said detecting unit, said control unit stores said pickup image into said memory, and transmits by said communicative unit said pickup image stored in said memory in case of becoming communicable.

4. An image pickup device according to claim 1, wherein said manipulative unit includes a shutter switch for instructing a start of photographing by said image pickup unit.

5. An image pickup device according to claim 1, wherein said control unit sets said predetermined time period differently according to a mode.

6. An image pickup method having a communicative function to transmit pickup images obtained of a subject, comprising:
   an image pickup step for obtaining a pickup image by photographing said subject;
   a manipulative step for instructing a predetermined operation;
   a communicative step for transmitting said pickup image obtained in said image pickup step to a transmission destination; and
   a control step for starting an operation of said communicative step when said predetermined operation is instructed in said manipulative step,
   wherein said control step controls said communicative step so as to make a break in communication with said transmission destination after a lapse of a predetermined time period from a time when transmission of the pickup image was completed, and
   wherein said control step sets as said predetermined time period a time period that differs according to a situation of said image pickup method.

7. An image pickup method according to claim 6, further comprising:
   a store control step for storing said pickup image obtained in said image pickup step into a memory; and
   a detecting step for detecting a state of communication with said transmission destination,
   wherein said control step stores said pickup image into said memory based on a detection result obtained in said detecting step.

8. An image pickup method according to claim 6, wherein, in a case of being incommunicable as determined based on said detection result obtained in said detecting step, said control step once stores said pickup image into said memory, and transmits in said communicative step said pickup image stored in said memory in case of becoming communicable.

9. An image pickup method according to claim 6, wherein said manipulative step includes using a shutter switch for instructing a start of photographing in said image pickup step.

10. An image pickup method according to claim 6, wherein said control step sets said predetermined time period differently according to a mode.

11. A computer-readable storage medium in which is stored computer-readable code for a processing method for transmitting pickup images obtained of a subject, wherein said processing method comprises:
    an image pickup step for obtaining a pickup image by photographing said subject;
    a manipulative step for instructing a predetermined operation;
    a communicative step for transmitting said pickup image obtained in said image pickup step to a transmission destination; and
    a control step for starting an operation of said communicative step when said predetermined operation is instructed in said manipulative step,
    wherein said control step controls said communicative step so as to make a break in communication with said transmission destination after a lapse of a predetermined time period from a time when the transmission of said pickup image was completed, and
    wherein said control step sets as said predetermined time period a time period that differs according to a situation of said processing step.

12. A storage medium as set forth in claim 11, wherein said processing method further comprises:
    a store control step for storing said pickup image obtained in said image pickup step into a memory; and
    a detecting step for detecting a state of communication with said transmission destination,
    wherein said control step stores said pickup image into said memory based on a detection result obtained in said detecting step.

13. A storage medium as set forth in claim 11, wherein, in a case of being incommunicable as determined based on said detection result obtained in said detecting step, said control step stores said pickup image into said memory, and transmits in said communicative step said pickup image stored in said memory in case of becoming communicable.

14. A storage medium as set forth in claim 11, wherein said manipulative step includes using a shutter switch for instructing a start of photographing in said image pickup step.

15. A storage medium as set forth in claim 11, wherein said control step sets said predetermined time period differently according to a mode.

* * * * *